US008286052B2

(12) United States Patent
Pan et al.

(10) Patent No.: US 8,286,052 B2
(45) Date of Patent: *Oct. 9, 2012

(54) WIRELESS COMMUNICATION METHOD AND APPARATUS FOR DETECTING AND DECODING ENHANCED DEDICATED CHANNEL HYBRID AUTOMATIC REPEAT REQUEST INDICATOR CHANNEL TRANSMISSIONS

(75) Inventors: Kyle Jung-Lin Pan, Smithtown, NY (US); Rui Yang, Greenlawn, NY (US); Stephen E. Terry, Northport, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 681 days.

This patent is subject to a terminal disclaimer.

(21) Appl. No.: 12/469,982

(22) Filed: May 21, 2009

(65) Prior Publication Data

US 2009/0228753 A1 Sep. 10, 2009

Related U.S. Application Data

(63) Continuation of application No. 11/477,278, filed on Jun. 29, 2006, now Pat. No. 7,574,645.

(60) Provisional application No. 60/709,952, filed on Aug. 18, 2005.

(51) Int. Cl.
*H03M 13/00* (2006.01)
(52) U.S. Cl. .......................... 714/758; 714/749; 714/754
(58) Field of Classification Search .................. 714/758, 714/749, 751, 754, 794; 370/395
See application file for complete search history.

(56) References Cited

U.S. PATENT DOCUMENTS

| 6,556,634 | B1 | 4/2003 | Dent |
| 6,678,249 | B2 | 1/2004 | Toskala et al. |
| 7,143,330 | B2 | 11/2006 | Ahn et al. |
| 7,239,870 | B2 | 7/2007 | Zhang et al. |
| 7,331,008 | B2 | 2/2008 | Cheng et al. |
| 8,000,256 | B2 * | 8/2011 | Cha et al. ................ 370/252 |
| 8,018,945 | B2 * | 9/2011 | Zhang et al. ............. 370/394 |
| 8,023,463 | B2 * | 9/2011 | Dick et al. ................ 370/331 |
| 2003/0145269 | A1 | 7/2003 | Kuo et al. |
| 2006/0133273 | A1 | 6/2006 | Julian et al. |

FOREIGN PATENT DOCUMENTS

| EP | 1 509 060 | 2/2005 |
| JP | 2004-032125 | 1/2004 |
| JP | 2005-051713 | 2/2005 |
| JP | 2006-217092 | 8/2006 |
| WO | 03/096150 | 11/2003 |
| WO | 2004/102980 | 11/2004 |
| WO | 2005/025117 | 3/2005 |
| WO | 2006/016775 | 2/2006 |
| WO | 2006/058117 | 6/2006 |

OTHER PUBLICATIONS

Nokia, "Removal of Non-Serving RLS," 3GPP TSG-RAN WG2 Meeting #47, R2-051300 (May 9-13, 2005). Qualcomm Europe, "Error requirements on E-DCH control channels," 3GPP TSG-RAN1 #40 bis, R1-05-0363 (Apr. 4-8, 2005).
Third Generation Partnership Project, "Technical Specification Group Radio Access Network; FDD Enhanced Uplink; Physical Layer Aspects (Release 6)," 3GPP TR 25.808 V6.0.0 (Mar. 2005).

* cited by examiner

*Primary Examiner* — Fritz Alphonse
(74) *Attorney, Agent, or Firm* — Volpe and Koenig, P.C.

(57) ABSTRACT

A wireless communication method and apparatus for detecting and decoding enhanced dedicated channel (E-DCH) hybrid automatic repeat request (H-ARQ) indicator channel (E-HICH) transmissions are disclosed. A wireless transmit/receive unit (WTRU) receives E-HICH transmissions and detects an H-ARQ indicator transmitted via the E-HICH by performing a binary hypothesis test. The WTRU then generates an acknowledgement (ACK) message or a non-acknowledgement (NACK) message based on the detected H-ARQ indicator. A reliability test may be further performed to improve performance, whereby the binary hypothesis test may be performed only if the reliability test is passed.

15 Claims, 3 Drawing Sheets

400

… (1)

WIRELESS COMMUNICATION METHOD AND APPARATUS FOR DETECTING AND DECODING ENHANCED DEDICATED CHANNEL HYBRID AUTOMATIC REPEAT REQUEST INDICATOR CHANNEL TRANSMISSIONS

CROSS REFERENCE TO RELATED APPLICATION

This application is a continuation of U.S. patent application Ser. No. 11/477,278, filed Jun. 29, 2006, which issued on Aug. 11, 2009 as U.S. Pat. No. 7,574,645, which claims the benefit of U.S. Provisional Application Ser. No. 60/709,952, filed Aug. 18, 2005, which are incorporated by reference as if fully set forth.

FIELD OF INVENTION

The present invention is related to a wireless communication system. More particularly, the present invention is related to a wireless communication method and apparatus for detecting and decoding enhanced dedicated channel (E-DCH) hybrid automatic repeat request (H-ARQ) indicator channel (E-HICH) transmissions.

BACKGROUND

Enhanced Uplink (EU) is one of the major features in third generation partnership project (3GPP) frequency division duplex (FDD) systems. EU offers a peak data rate of 5.76 Mbps. In order to support EU operation, several downlink physical channels are provided to transmit control information. One of the downlink physical channels is the E-HICH.

FIG. 1 is a block diagram of a conventional wireless communication system 100 which supports EU. The system 100 comprises a wireless transmit/receive unit (WTRU) 102, a Node-B 104 and a radio network controller (RNC) 106. The RNC 106 controls overall E-DCH operation by configuring E-DCH parameters for the Node-B 104 and the WTRU 102, such as initial transmit power level, maximum allowed transmit power or available channel resources per Node-B. Between the WTRU 102 and the Node-B 104, an E-DCH 108, an E-DCH dedicated physical control channel (E-DPCCH), an E-DCH absolute grant channel (E-AGCH) 112, an E-DCH relative grant channel (E-RGCH) 114 and an E-HICH 116 are established for supporting E-DCH operations.

For E-DCH transmissions, the WTRU 102 sends triggered scheduling information, (also known as a rate request), for the logical channels which a radio resource control (RRC) determines that reporting is needed to be made to the Node-B 104 via the E-DCH 108. The Node-B 104 sends a scheduling grant to the WTRU 102 via the E-AGCH 112 or the E-RGCH 114. After E-DCH radio resources are allocated for the WTRU 102, the WTRU 102 transmits uplink (UL) data via the E-DCH 108. In response to E-DCH or E-DPCCH transmissions, the Node-B 104 sends an acknowledgement (ACK) or a non-acknowledgement (NACK) message for H-ARQ operation via the E-HICH 116.

The E-HICH 116 is a very important channel for fast transmission and retransmission of E-DCH data. A reliable detection of the E-HICH transmission is therefore critical for EU operation. A successful detection and decoding of the E-HICH transmission significantly affects the performance of data transmissions for the E-DCH, and affects the performance of the entire EU systems. Therefore, it is desirable to have a method and apparatus for efficiently detecting and decoding E-HICH transmissions.

SUMMARY

The present invention is related to a wireless communication method and apparatus for detecting and decoding E-HICH transmissions. A WTRU receives E-HICH transmissions and detects an H-ARQ indicator transmitted via the E-HICH by performing a binary hypothesis test. The WTRU then generates an ACK message or a NACK message based on the detected H-ARQ indicator. A reliability test may be further performed to improve performance, whereby the binary hypothesis test may be performed only if the reliability test is passed.

BRIEF DESCRIPTION OF THE DRAWINGS

A more detailed understanding of the invention may be had from the following description, given by way of example and to be understood in conjunction with the accompanying drawings wherein.

DETAILED DESCRIPTION OF THE PREFERRED EMBODIMENTS

When referred to hereafter, the terminology "WTRU" includes but is not limited to a user equipment (UE), a mobile station, a fixed or mobile subscriber unit, a pager, or any other type of device capable of operating in a wireless environment. When referred to hereafter, the terminology "Node-B" includes but is not limited to a base station, a site controller, an access point or any other type of interfacing device in a wireless environment.

The features of the present invention may be incorporated into an integrated circuit (IC) or be configured in a circuit comprising a multitude of interconnecting components.

Figure 1:
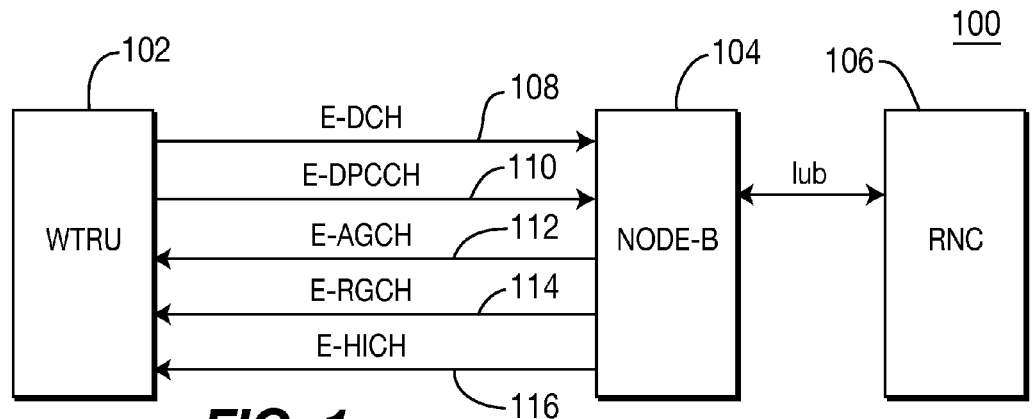
FIG. 1 is a block diagram of a conventional wireless communication system.
Figure 2:
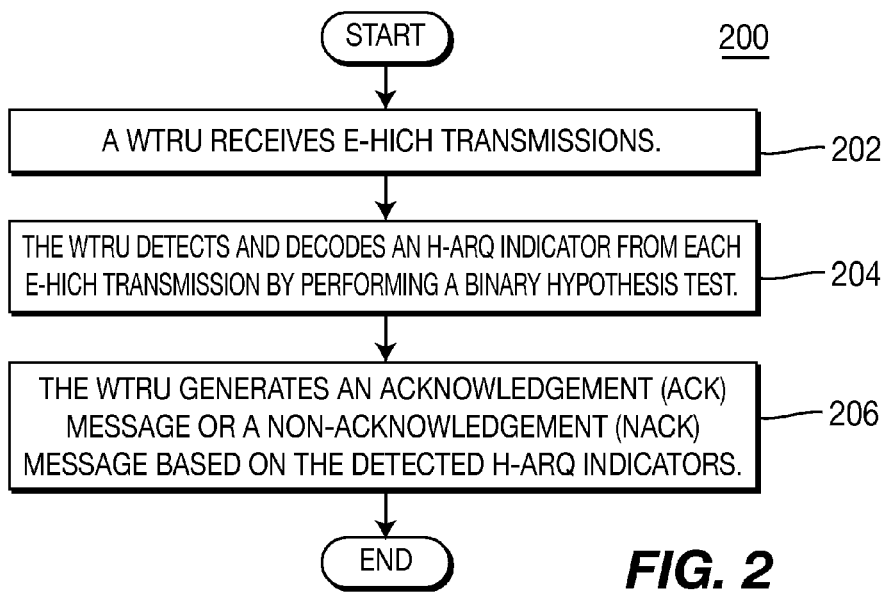
FIG. 2 is a flow diagram of a process for detecting and decoding E-HICH transmissions in accordance with the present invention.

FIG. 2 is a flow diagram of a process 200 for detecting and decoding E-HICH transmissions in accordance with the present invention. In step 202, a WTRU receives E-HICH transmissions from a serving radio link set (RLS) and possibly from at least one non-serving radio link (RL) as well. A serving RLS is a set of cells which contains at least a serving E-DCH cell and from which the WTRU shall receive an absolute grant. A WTRU may receive relative grant(s) from the serving RLS. In the case when the WTRU receives multiple relative grants from the serving RLS, the received relative grants may be soft combined for enhanced received signal-to-noise ratio (SNR) and improved signal quality. The WTRU has only one serving RLS. A non-serving RL is a cell which belongs to the E-DCH active set but does not belong to the serving RLS and from which the WTRU may receive a relative grant. The WTRU may have zero, one or several non-serving RL(s). In step 204, the WTRU detects and decodes an H-ARQ indicator from each E-HICH transmission by performing a binary hypothesis test, which will be explained in detail hereinafter. In step 206, the WTRU generates an ACK message or a NACK message based on the detected H-ARQ indicators.

The detection of the H-ARQ indicator is performed by the binary hypothesis test for both a serving RLS and a non-serving RL. Optionally, a reliability tests may also be performed in combination with the binary hypothesis tests for additional performance improvement, which will be explained in detail hereinafter.

The H-ARQ indicator transmitted by the serving RLS or the non-serving RL may be either an ACK indicator or a NACK indicator. The H-ARQ indicator from the serving RLS may be detected with a detection threshold of zero, while the H-ARQ indicator from the non-serving RL may be detected with a non-zero detection threshold. Alternatively, if the performance requirement is different between detecting an ACK indicator and a NACK indicator, the detection of the H-ARQ indicator from the serving RLS may be detected with a non-zero detection threshold. In this case, non-symmetric detection thresholds are required for the detection of the H-ARQ indicator from a non-serving RL.

Assume that the E-HICH has an average energy $E_l$ for the l-th RLS after correlation and soft combining. Without loss of generality it is assumed that the first RLS, (i.e., l=1), is the serving RLS and the remaining RLSs, (i.e., l=2, ..., L), are the non-serving RLs. For a serving RLS, an ACK indicator and a NACK indicator are sent with an amplitude $\sqrt{E_l}$ and $-\sqrt{E_l}$, respectively. For a non-serving RL, an ACK indicator and a NACK indicator are sent with an amplitude $\sqrt{E_l}$ and 0, respectively.

$y^{(l)}$ denotes the soft indicator, (i.e., a soft sample), after correlation for the l-th RLS. A log likelihood ratio (LLR) for the binary hypothesis tests for detection of an ACK indicator and a NACK indicator is expressed as follows:

$$LLR^{(l)} = \ln \frac{P_r(y^{(l)} \mid H_1)}{P_r(y^{(l)} \mid H_0)}; \qquad \text{Equation (1)}$$

where $H_0$ and $H_1$ denote the hypothesis tests NACK and ACK, respectively.

Assuming white Gaussian noise with variance $\sigma_n^2$ after correlation, the H-ARQ indicator for the serving RLS is detected as an ACK indicator or a NACK indicator as follows:

an ACK indicator, if $$LLR^{(l)} = \frac{2}{\sigma_n} y^{(l)} \sqrt{\gamma_l} \geq 0$$

(or simply if $LLR^{(l)} = y^{(l)} \geq 0$); and a NACK indicator, otherwise;

where $$\gamma_l, \left( \gamma_l = \frac{E_l}{\sigma_n^2} \right),$$

denotes the average SNR of an E-HICH for the serving RLS, (i.e., l=1), after correlation and soft combining.

The LLR for the binary hypothesis tests for a non-serving RL is expressed as follows:

$$LLR^{(l)} = \frac{1}{\sigma_n} y^{(l)} \sqrt{\gamma_l} - \frac{1}{2} \gamma_l. \qquad \text{Equation (2)}$$

An H-ARQ indicator for the non-serving RL is detected as an ACK indicator or a NACK indicator as follows:

an ACK indicator, if $$LLR^{(l)} = \frac{1}{\sigma_n} y^{(l)} \sqrt{\gamma_l} - \frac{1}{2} \gamma_l \geq T^{(l)};$$

and a NACK indicator, otherwise.

where $\gamma_l$ denotes the average SNR of an E-HICH for the non-serving RL, (the l-th RLS, i.e., l=2, 3, ..., L), after correlation. $T^{(l)}$ is a detection threshold for the l-th RLS. $T^{(l)}$ may be the same for all the non-serving RLs or may be different between non-serving RLs based on the designs and performance requirements for detection.

When multiple measurements are available, the detection of an H-ARQ indicator using multiple measurement hypothesis tests may be performed. Assume that there are M measurements. $y_m^l$ denotes the soft indicator, (i.e., soft sample), after correlation for the l-th RLS and the m-th correlation output or decoding measurement for the E-HICH. Similarly without loss of generality, it is assumed that the first RLS, (i.e., l=1), is the serving RLS and the remaining RLSs, (i.e., l=2, ..., L), are non-serving RLs. The LLR for multiple measurement hypothesis tests for detection of an ACK indicator and a NACK indicator for the serving RLS is expressed as follows:

$$LLR^{(l)} = \ln \frac{P_r(y_1^{(l)}, y_2^{(l)}, \ldots, y_M^{(l)} \mid H_1)}{P_r(y_1^{(l)}, y_2^{(l)}, \ldots, y_M^{(l)} \mid H_0)}. \qquad \text{Equation (3)}$$

The H-ARQ indicator for the serving RLS is detected as an ACK indicator or a NACK indicator using multiple measurement hypothesis tests as follows:

an ACK indicator, if $$LLR^{(l)} = \sum_{m=1}^{M} \left( \frac{2}{\sigma_n} y_m^{(l)} \sqrt{\gamma_l} \right) \geq 0;$$

and a NACK indicator, otherwise.

The H-ARQ indicator for the non-serving RL is detected as an ACK indicator or a NACK indicator as follows:
an ACK indicator, if $$LLR^{(l)} = \sum_{m=1}^{M} \left( \frac{1}{\sigma_n} y_m^{(l)} \sqrt{\gamma_l} - \frac{1}{2} \gamma_l \right) \geq T^{(l)};$$

and
a NACK indicator, otherwise.

$T^{(l)}$ is a detection threshold for the l-th RLS. $T^{(l)}$ may be the same for all the non-serving RLs or may be different between non-serving RLs based on the designs and performance requirements for detection.

Figure 3:
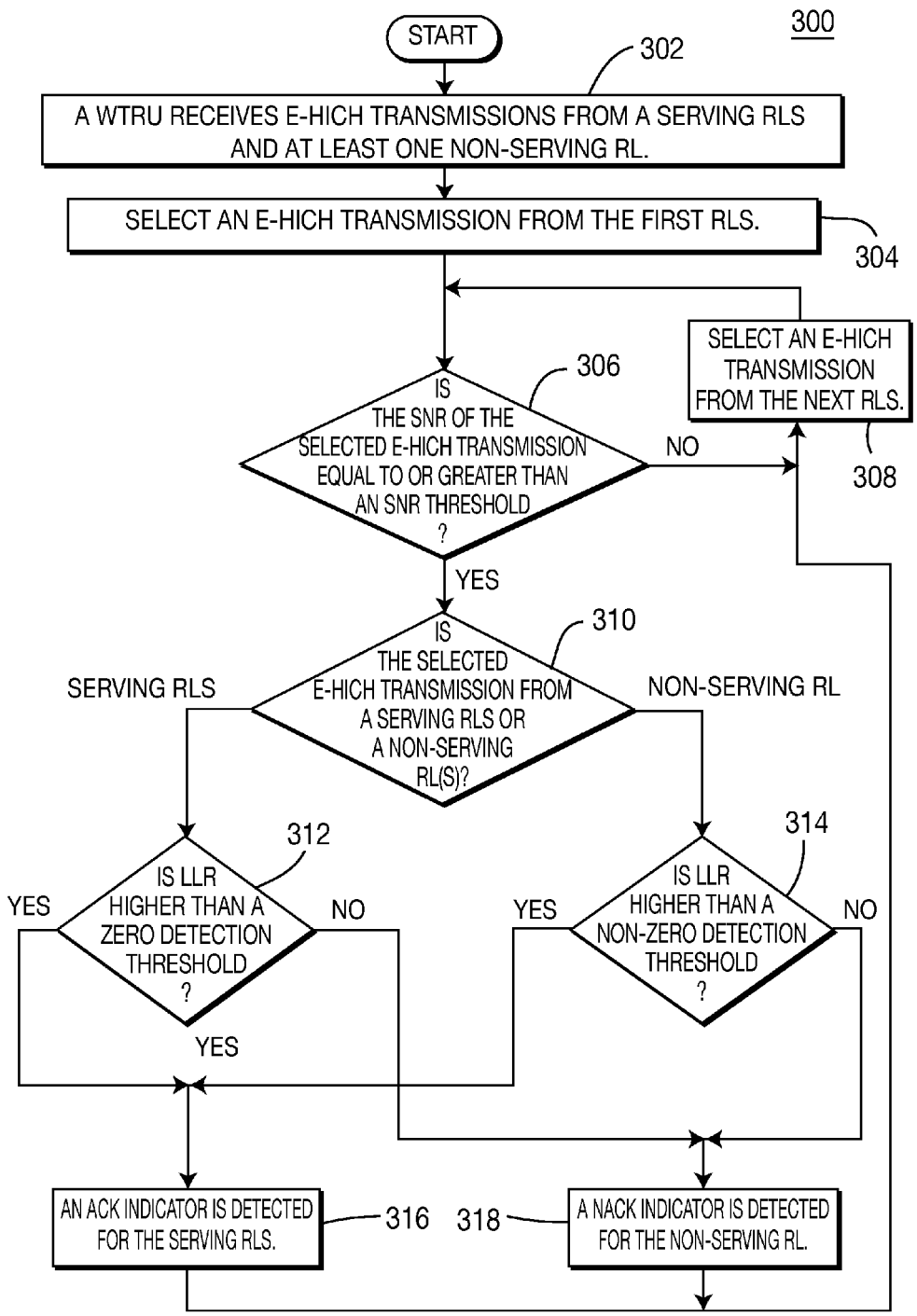
FIG. 3 is a flow diagram of a process for detecting an H-ARQ indicator in accordance with the present invention.

FIG. 3 is a flow diagram of a process 300 for detecting an H-ARQ indicator in accordance with the present invention. A WTRU receives E-HICH transmissions from a serving RLS and at least one non-serving RL (step 302). An E-HICH transmission from the first RLS is selected (step 304). An optional reliability test may be then performed. The reliability test may not be performed in some cases when performance requirement has satisfied. For the reliability test, SNR, (measured or calculated), of the selected E-HICH transmission is compared to an SNR threshold (step 306). If the SNR is not higher than the SNR threshold, the reliability test fails and the process 300 proceeds to step 308 to select an E-HICH transmission from the next RLS. If the SNR is equal to or greater than the SNR threshold, the reception of the E-HICH transmission is said to be reliable in terms of signal quality, and a binary hypothesis test is performed.

For the binary hypothesis test, it is first determined whether the selected E-HICH transmission is from the serving RLS or from the non-serving RL(s) (step 310). If the selected E-HICH transmission is determined in step 310 to be from the serving RLS, an LLR is compared to a zero detection threshold. If the LLR is higher than the zero detection threshold, an ACK indicator is detected for the serving RLS (step 316) and if the LLR is not higher than the zero detection threshold, a NACK indicator is detected for the serving RLS (step 318). If the selected E-HICH transmission is determined in step 310 to be from the non-serving RL, the LLR is compared to a non-zero detection threshold (step 314). If the LLR is higher than the detection threshold, an ACK indicator is detected for the non-serving RL (step 316) and if the LLR is not higher than the detection threshold, a NACK indicator is detected for the non-serving RL (step 318). Alternatively, a non-zero detection threshold may be used for the serving RLS and non-symmetric detection thresholds between ACK and NACK may be used for both the serving RLS and non-serving RLs.

Figure 4:
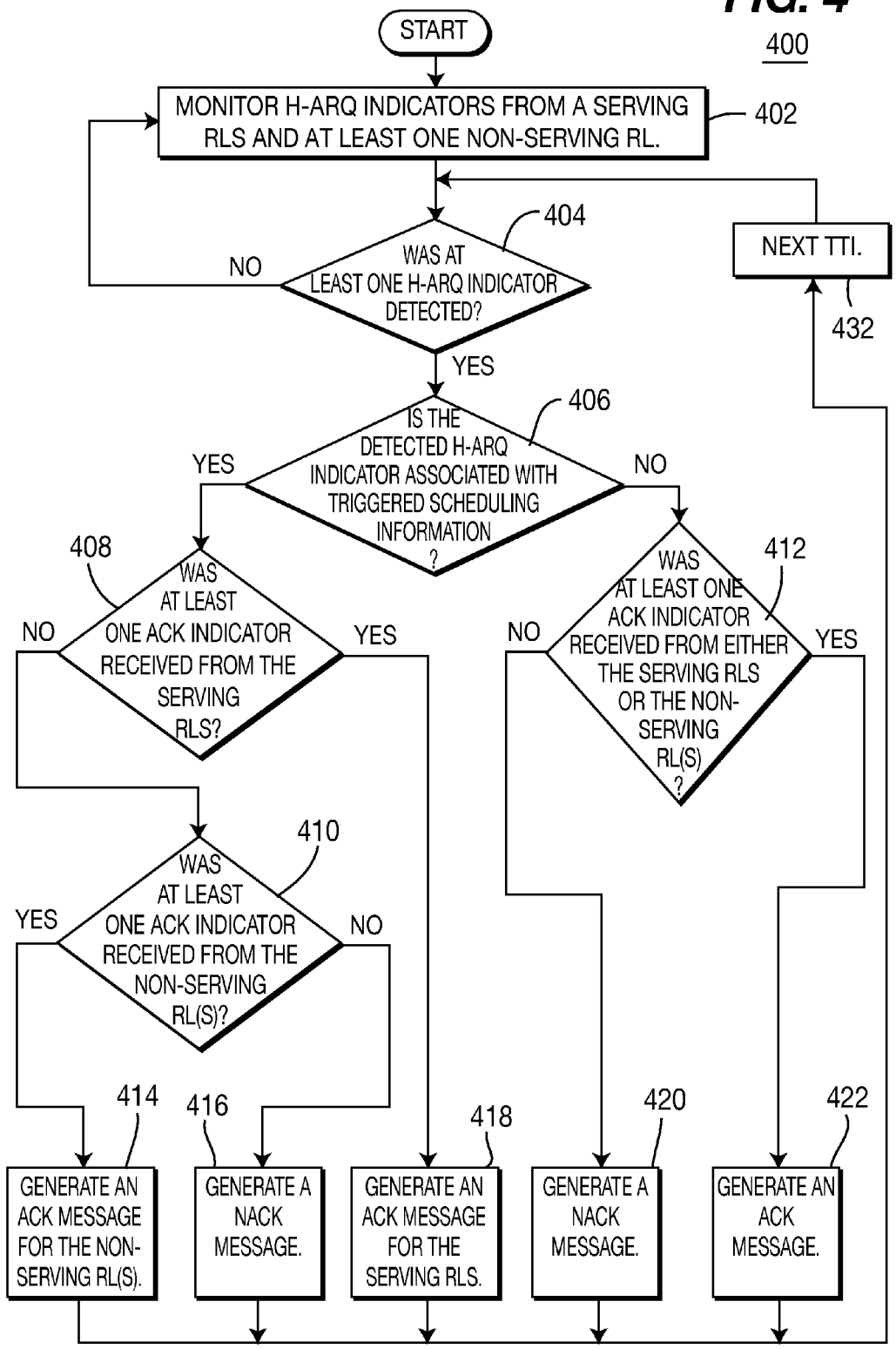
FIG. 4 is a flow diagram of a process for generating an ACK message or a NACK message from the detected H-ARQ indicator in accordance with the present invention.

FIG. 4 is a flow diagram of a process 400 for generating an ACK message or a NACK message in accordance with the present invention. When macro diversity combining is implemented, the WTRU may receive multiple H-ARQ indicators from the serving RLS and the non-serving RL(s). The H-ARQ indicators from different RLs are independent from each other. Generally, the WTRU generates an ACK message if the WTRU detects at least one ACK indicator from any RLs and generates a NACK message if the WTRU does not detect any ACK indicator. An H-ARQ indicator associated with triggered scheduling information which is sent by the WTRU for requesting a scheduling grant from a serving E-DCH cell is an exception, which will be explained in detail hereinafter.

The WTRU continuously monitors H-ARQ indicators from the serving RLS and at least one non-serving RL (step 402). If it is determined at step 404 that any H-ARQ indicator is detected, the WTRU determines whether the detected H-ARQ indicator is associated with triggered scheduling information (step 406).

If the detected H-ARQ indicator is not associated with triggered scheduling information, the WTRU further determines whether at least one ACK indicator has been received from either the serving RLS or the non-serving RL(s) (step 412). If at least one ACK indicator has been received, the WTRU generates an ACK message (step 422). If an ACK indicator has not been received, the WTRU generates a NACK message (step 420).

If, in step 406, it is determined that the detected H-ARQ indicator is associated with triggered scheduling information, it is further determined whether at least one ACK indicator has been received from the serving RLS (step 408). In the case of triggered scheduling information, an ACK indicator or a NACK indicator should be sent to the WTRU from the serving RLS to indicate success or failure of reception of the scheduling information at the serving RLS. Since only the serving cell can send the scheduling grants in response to the triggered scheduling information, the ACK/NACK indicators are distinguished between the serving RLS and the non-serving RL(s). If, in step 408, it is determined that at least one ACK indicator was received from the serving RLS, an ACK message is generated for the serving RLS by the WTRU (step 418). If, in step 408, it is determined that there is no ACK indicator received from the serving RLS, it is then determined whether at least one ACK indicator has been received from the non-serving RL(s) (step 410). If an ACK indicator is received from the non-serving RL, an ACK message for the non-serving RL(s) is generated (step 414). If there is no ACK indicator received from the non-serving RL(s), a NACK message is generated (step 416).

Non-serving E-DCH RLs do not transfer the received triggered scheduling information to the serving E-DCH cell from which the absolute grant is sent to the WTRU to respond to the triggered scheduling information. If an ACK is received by the WTRU for the serving E-DCH cell in response to the transmission of the triggered scheduling information, it indicates that the transmission of the triggered scheduling information is successfully received by the serving cell scheduler in the serving E-DCH cell. For data other than triggered scheduling information, if there is at least one ACK from ether the serving RLS or non-serving RL(s), it is sufficient for the data since the data is processed in a core network higher than the serving RLS. If, in response to the transmission of the triggered scheduling information, a NACK is received by the WTRU for the serving E-DCH RLS but an ACK is received for the non-serving RL(s), the triggered scheduling information should be re-transmitted. After generation of an ACK or a NACK message, the process 400 waits for a next transmission time interval (TTI) (step 424).

Figure 5:
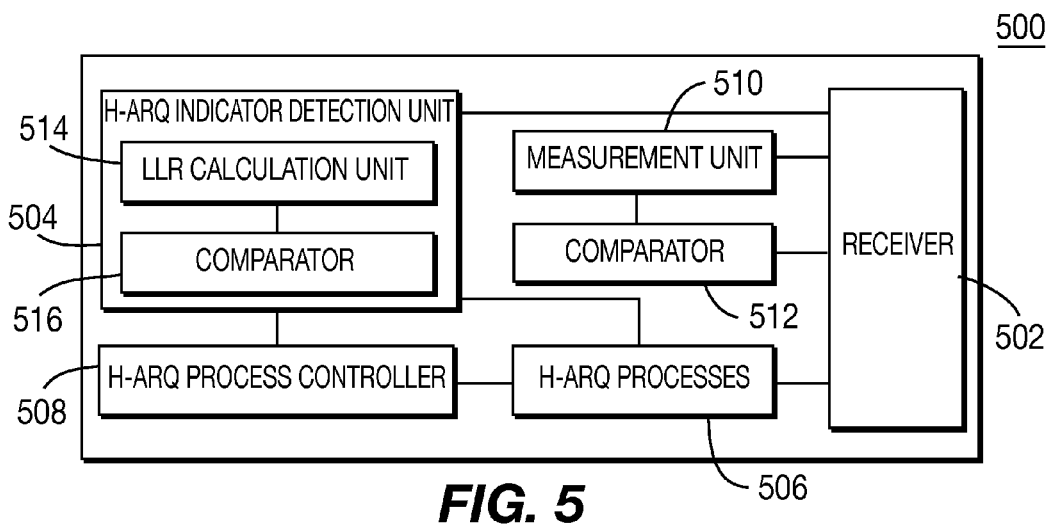
FIG. 5 is a block diagram of an exemplary WTRU configured in accordance with the present invention.

FIG. 5 is a block diagram of an exemplary WTRU 500 configured in accordance with the present invention. The WTRU 500 includes a receiver 502, an H-ARQ indicator detection unit 504, a plurality of H-ARQ processes 506, an H-ARQ process controller 508, a measurement unit 510 and a comparator 512. The receiver 502 receives E-HICH transmissions from the serving RLS and the non-serving RL. The H-ARQ indicator detection unit 504 detects H-ARQ indicators transmitted via the E-HICH by performing a binary hypothesis test as described hereinabove. The H-ARQ process controller 508 controls the H-ARQ processes 506 and generates an ACK or a NACK message based on the detected H-ARQ indicator.

The H-ARQ indicator detection unit 504 includes an LLR calculation unit 514 and a comparator 516. The LLR calculation unit 514 calculates an LLR of conditional probability of an ACK and a NACK on the E-HICH transmission. The comparator 516 compares the LLR with a detection threshold. The H-ARQ process controller 508 generates a NACK message if the LLR is below the detection threshold, and generates an ACK message if the LLR is not below the detection threshold. The measurement unit 510 measures the SNR of the E-HICH, and the comparator 512 compares the SNR with an SNR threshold for performing the reliability test.

Although the features and elements of the present invention are described in the preferred embodiments in particular combinations, each feature or element can be used alone without the other features and elements of the preferred embodiments or in various combinations with or without other features and elements of the present invention.

What is claimed is:

1. A method of detecting an enhanced dedicated channel (E-DCH) hybrid automatic repeat request (H-ARQ) indicator, the method comprising:
   a wireless transmit/receive unit (WTRU) receiving an E-DCH H-ARQ indicator channel (E-HICH) transmission carrying an H-ARQ indicator;
   the WTRU calculating a log likelihood ratio (LLR) of a conditional probability that an acknowledgement (ACK) indicator is transmitted to a conditional probability that a non-acknowledgement (NACK) indicator is transmitted;
   the WTRU comparing the LLR to a predetermined threshold; and
   the WTRU determining the H-ARQ indicator as a NACK indicator on a condition that the LLR is below the threshold, and determining the HARQ indicator is an ACK indicator on a condition that the LLR is not below the threshold.

2. The method of claim 1 further comprising:
   the WTRU performing a reliability test, wherein the LLR is calculated and compared to the threshold on a condition that the reliability test is passed.

3. The method of claim 2 wherein the reliability test comprises:
   the WTRU measuring a signal-to-noise ratio (SNR) of the E-HICH; and
   the WTRU comparing the SNR with an SNR threshold, wherein the reliability test is passed on a condition that the measured SNR exceeds the SNR threshold.

4. The method of claim 1 wherein the H-ARQ indicator is received from a serving radio link set.

5. The method of claim 4 wherein the threshold is a zero-threshold.

6. The method of claim 1 wherein the H-ARQ indicator is received from a non-serving radio link.

7. The method of claim 6 wherein the threshold is a non-zero threshold.

8. The method of claim 1 further comprising:
   the WTRU determining whether the H-ARQ indicator is related to triggered scheduling information which is transmitted for requesting a scheduling grant from a serving E-DCH cell, wherein in case that the H-ARQ indicators are related to the triggered scheduling information, an ACK message is generated on a condition that an H-ARQ indicator from a serving radio link set (RLS) is detected as an ACK.

9. A wireless transmit/receive unit (WTRU) configured to detect an enhanced dedicated channel (E-DCH) hybrid automatic repeat request (H-ARQ) indicator, the WTRU comprising:
   a receiver configured to receive an E-DCH H-ARQ indicator channel (E-HICH) transmission carrying an H-ARQ indicator;
   a log likelihood ratio (LLR) calculation unit configured to calculate an LLR of a conditional probability that an acknowledgement (ACK) indicator is transmitted to a conditional probability that a non-acknowledgement (NACK) indicator is transmitted;
   a comparator configured to compare the LLR to a predetermined threshold; and
   a controller configured to determine the H-ARQ indicator as a NACK indicator on a condition that the LLR is below the threshold, and determining the HARQ indicator is an ACK indicator on a condition that the LLR is not below the threshold.

10. The WTRU of claim 9 further comprising:
    a measurement unit configured to measure a signal-to-noise ratio (SNR) of the E-HICH; and
    a second comparator configured to compare the SNR with an SNR threshold, wherein the LLR is calculated and compared to the threshold on a condition that the measured SNR exceeds the SNR threshold.

11. The WTRU of claim 9 wherein the H-ARQ indicator is received from a serving radio link set.

12. The WTRU of claim 11 wherein the threshold is a zero-threshold.

13. The WTRU of claim 9 wherein the H-ARQ indicator is received from a non-serving radio link.

14. The WTRU of claim 13 wherein the threshold is a non-zero threshold.

15. The WTRU of claim 9 wherein the controller is configured to determine whether the H-ARQ indicator is related to triggered scheduling information which is transmitted for requesting a scheduling grant from a serving E-DCH cell, and in case that the H-ARQ indicators are related to the triggered scheduling information, an ACK message is generated on a condition that an H-ARQ indicator from a serving radio link set (RLS) is detected as an ACK.

* * * * *